United States Patent [19]
Leising et al.

[11] Patent Number: 5,695,892
[45] Date of Patent: Dec. 9, 1997

[54] PREPARATION OF SILVER VANADIUM OXIDE USING NITRIC ACID WITH OXIDE STARTING MATERIALS

[75] Inventors: Randolph A. Leising, Williamsville; Esther S. Takeuchi, East Amherst, both of N.Y.

[73] Assignee: Wilson Greatbatch Ltd., Clarence, N.Y.

[21] Appl. No.: 700,212

[22] Filed: Aug. 20, 1996

[51] Int. Cl.⁶ .................... H01M 4/54; H01M 4/48
[52] U.S. Cl. .................... 429/219; 429/220; 29/623.1
[58] Field of Search .................... 429/219, 220, 429/623.1

[56] References Cited

U.S. PATENT DOCUMENTS

| | | | |
|---|---|---|---|
| 4,310,609 | 1/1982 | Liang et al. | 429/194 |
| 4,830,940 | 5/1989 | Keister et al. | 429/194 |
| 5,389,472 | 2/1995 | Takeuchi et al. | 429/219 |
| 5,435,874 | 7/1995 | Takeuchi et al. | 156/242 |
| 5,472,810 | 12/1995 | Takeuchi et al. | 429/218 |
| 5,498,494 | 3/1996 | Takeuchi et al. | 429/219 |
| 5,516,340 | 5/1996 | Takeuchi et al. | 29/623.1 |

FOREIGN PATENT DOCUMENTS 618 630 A1 10/1994 European Pat. Off.

OTHER PUBLICATIONS

Znaidi et al., "Synthesis of Vanadium Bronzes . . . " Mat. Res. Bull. vol. 24, pp. 1501–1514, Dec. 1989.

Ha–Eierdanz et al., "A novel means of synthesis for vanadium bronzes", Chemical Abstracts Accesion No. 118:138460, Abstract from Z. Anorg. Allg. Chem. (1993) 619(2), 287–92, (no month available).

Badot et al., "Electrical transport properties in vanadium brinzes . . . " Chemical Abstracts Accession No. 117:182444, Abstract from Solid State Ionics (1992) 53–56 (Pt. 1), 343–50, (no month available).

Yamamura et al., "Method for synthesis of silver vanadium composite oxide", Chemical Abstracts Accession No. 115:74604, Abstract from Patent No. JP 03093628 A2, Apr. 1991.

Solid–State Synthesis and Characterization Of Silver Vanadium Oxide For Use As A Cathode Material For Lithium Batteries; Randolph A. Leising and Esther Sans Takeuchi; Chemistry of Materials, 1995; pp. 489–495 (no month available).

Primary Examiner—Stephen Kalafut
Assistant Examiner—Carol Chaney
Attorney, Agent, or Firm—Hodgson, Russ, Andrews, Woods & Goodyear LLP

[57] ABSTRACT

The present invention is related to an electrochemical cell comprising an anode of a Group IA metal and a cathode of a composite material prepared from a combination of vanadium oxide and a mixture of nitric acid and at least one of a silver-containing constituent and a copper-containing constituent. The present cathode material is particularly useful for implantable medical applications.

13 Claims, 4 Drawing Sheets

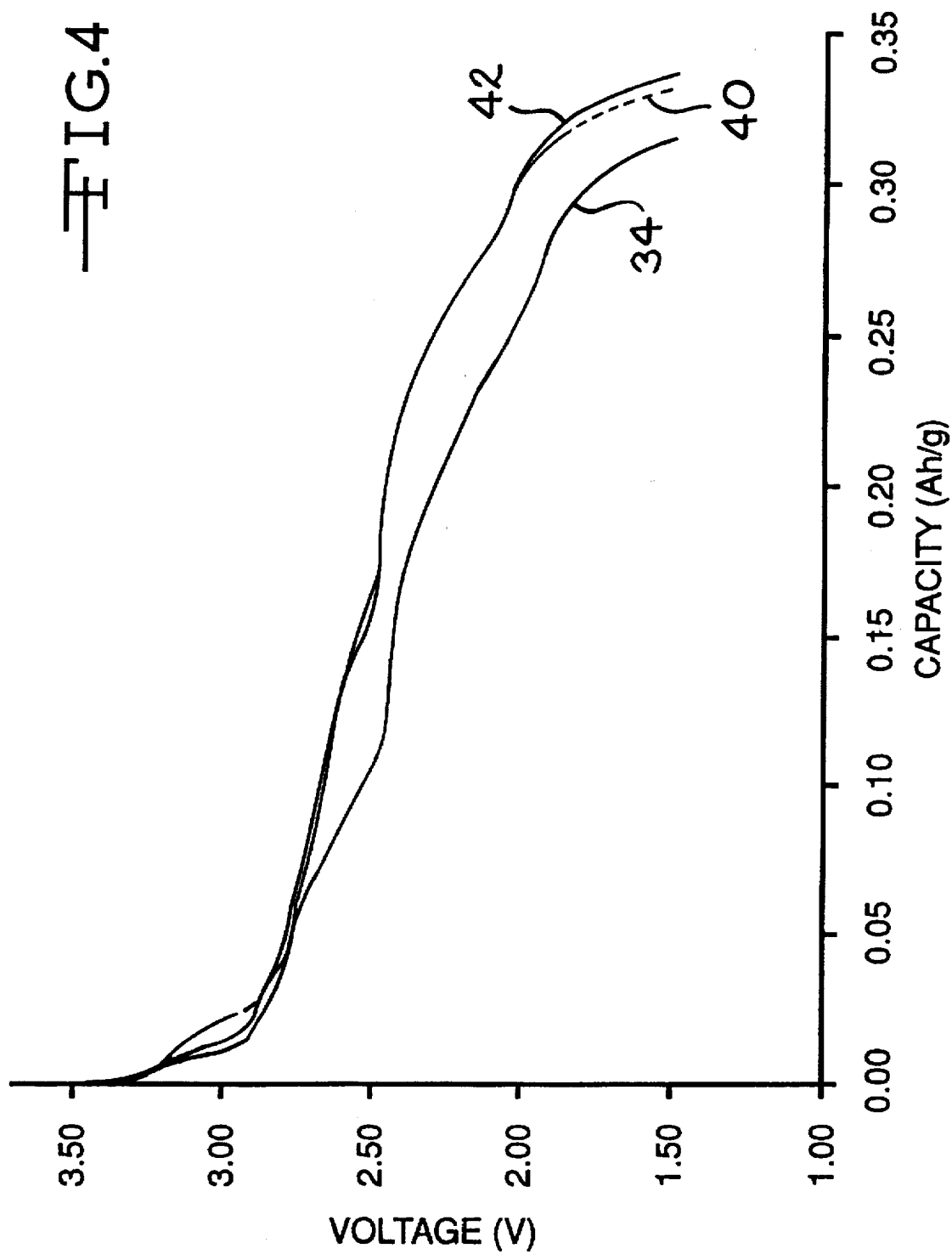

PREPARATION OF SILVER VANADIUM OXIDE USING NITRIC ACID WITH OXIDE STARTING MATERIALS

BACKGROUND OF THE INVENTION

1. Field of the Invention

The present invention generally relates to the conversion of chemical energy to electrical energy, and more particularly, to an alkali metal electrochemical cell having a positive electrode comprising a mixed metal oxide prepared using nitric acid. Preferred mixed metal oxides include silver vanadium oxide, copper vanadium oxide and copper silver vanadium oxide. This improved preparation technique minimizes the liberation of toxic $NO_x$ by-products.

2. Prior Art

Mixed metal oxides such as silver vanadium oxide are known for use as cathode active materials in electrochemical cells. U.S. Pat. No. 4,310,609 to Liang et al., which is assigned to the assignee of the present invention and incorporated herein by reference, describes a nonaqueous lithium electrochemical cell comprising a composite cathode material prepared by thermally decomposing a vanadium salt such as ammonium metavanadate to produce vanadium pentoxide. The nitrate or the nitrite of a second metal is then added to the vanadium pentoxide, thoroughly mixed therewith and thereafter ignited. The second metal is preferably selected from silver, copper, manganese and mixtures thereof. A typical product has the general formula $Ag_xV_2O_y$ wherein "x" is in the range from about 0.5 to about 2.0, and "y" is in the range from about 4.5 to about 6.0. Further, U.S. Pat. No. 5,472,810 to Takeuchi et al., which is assigned to the assignee of the present invention and incorporated herein by reference, describes the preparation of copper silver vanadium oxide by various methods including the decomposition of nitrate and nitrite starting materials.

The decomposition of nitrate and nitrite starting materials during the synthesis of mixed metal oxides such as silver vanadium oxide and copper silver vanadium oxide liberates $NO_x$ gas, which is highly toxic. The decomposition synthesis of these active materials therefore includes the removal and proper treatment of this toxic by-product.

SUMMARY OF THE INVENTION

In lieu of preparation techniques requiring nitrate and nitrite starting materials, the present invention is directed to mixed metal oxide active materials synthesized from non-nitrate and non-nitrite materials mixed with nitric acid. Nitric acid provides the benefits of the prior art decomposition preparations, i.e., active materials with increased ability for the intercalation and deintercalation of metal ions produced by oxidation of the anode while minimizing the detrimental side effects of toxic gaseous by-products.

Additionally, the present preparation techniques provide active materials with increased energy density which is an unexpected result.

These and other aspects of the present invention will become more apparent to those skilled in the art by reference to the following description and to the appended drawings.

BRIEF DESCRIPTION OF THE DRAWINGS

FIGS. 3 and 4 are graphs constructed from the discharge of cells having copper silver vanadium oxide prepared using nitric acid according to the present invention in comparison to cell incorporating the same active material synthesized according to various prior art preparation techniques.

DETAILED DESCRIPTION OF THE PREFERRED EMBODIMENTS

Figure 1:
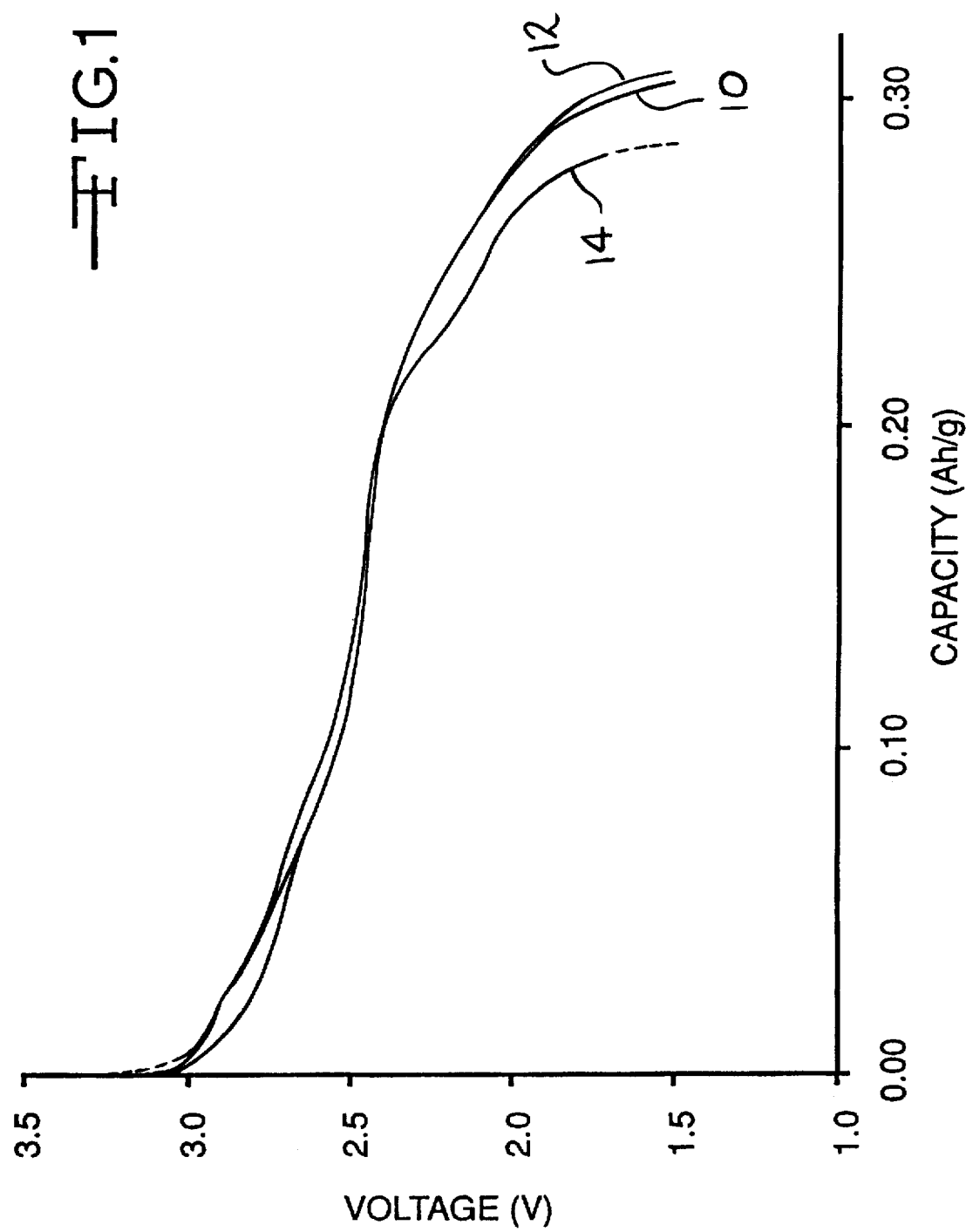
FIGS. 1 and 2 are graphs constructed from the discharge of cells having silver vanadium oxide prepared using nitric acid according to the present invention in comparison to cells incorporating silver vanadium oxide synthesized according to various prior art preparation techniques.

The electrochemical cell of the present invention comprises an anode of a metal selected from Group IA of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy, such as lithium-aluminum alloy. The greater the amount of aluminum present by weight in the alloy the lower the energy density of the cell.

The form of the anode may vary, but preferably the anode is a thin metal sheet or foil of the anode metal, pressed or rolled on a metallic anode current collector, i.e., preferably comprising nickel, to form an anode component. In the exemplary cell of the present invention, the anode component has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical reaction at the cathode involves conversion of ions which migrate from the anode to the cathode into atomic or molecular forms. The cathode material of the present invention comprises at least a first cathode active constituent which may be a metal, a metal oxide, a metal oxide or a mixed metal oxide comprising at least a first and a second metals or their oxides and possibly a third metal or metal oxide, or a mixture of a first and a second metals or their metal oxides incorporated in the matrix of a host metal oxide. The cathode active material may also comprise a metal sulfide.

The metal oxide or the mixed metal oxide can be constructed by the chemical addition, reaction, or otherwise intimate contact of various metal oxides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII of the Periodic Table of Elements which includes the noble metals and/or other oxide compounds.

According to one method of the present invention, metals or oxides of metal from Groups IB, IIB, IIIB, IVB, VB, VIB, VIIB, as well as from Group VIII are admixed with nitric acid and thermally treated so as to effect the rapid preparation of suitable cathode materials. Such materials include, but are not limited to, those classes of compounds known as oxides, carbonates, and/or ammonium salts. The precursor materials (i.e., oxides, carbonates, ammonium compounds, etc.) may be combined and subsequently reacted to form a cathode active material comprising a mixed metal oxide.

Preferred mixed metal oxides are prepared by mixing vanadium oxide with nitric acid and a metal or a metal oxide of a second metal and possibly a third metal. This admixture is thereafter reacted in an addition reaction to form the mixed metal oxide. The second and third metals are most preferably selected from silver, copper and manganese.

One preferred mixed metal oxide has the general formula $SM_xV_2O_y$ wherein SM is a metal selected from the Groups IB to VIIB and VIII of the Periodic Table of Elements and wherein x is about 0.30 to 2.0 and y is about 4.5 to 6.0 in the general formula. By way of illustration, and in no way intended to be limiting, one exemplary cathode active material comprises silver vanadium oxide (SVO) having the general formula $Ag_xV_2O_y$, in any one of its many phases, i.e., β-phase silver vanadium oxide having in the general formula x=0.35 and y=5.8, γ-phase silver vanadium oxide having in the general formula x=0.74 and y=5.37 and ε-phase silver vanadium oxide having in the general formula x=1.0 and y=5.5, and combination and mixtures of phases thereof.

The addition of nitric acid to a mixture of oxide starting materials produces a mixed metal oxide cathode material displaying increased capacity and increased bulk density. For example, the addition of 1 equivalent of nitric acid to a mixture of $Ag_2O$ and $V_2O_5$ produces a cathode material similar in capacity to $AgV_2O_{5.5}$ (SVO) prepared using a decomposition synthesis from $AgNO_3$ and $V_2O_5$ starting materials, such as is disclosed in the previously referenced U.S. Pat. No. 4,310,609 to Liang et al. This value is higher than the capacity of SVO typically prepared from $Ag_2O$ and $V_2O_5$ from a chemical addition reaction such as is described in U.S. Pat. No. 5,498,494 to Takeuchi et al., and which is assigned to the assignee of the present invention and incorporated herein by reference.

The capacities for test cells prepared as described above and discharged under a 249Ω load to +2.0 V are listed in Table 1. In addition, the bulk density of SVO prepared from the oxide/nitric acid method according to the present invention is 1.49 g/cm³, while silver vanadium oxide prepared from oxide starting materials alone is 1.05 g/cm³. A higher bulk density is desirable for most battery applications since it provides a cathode with higher energy density based on the volume of the material. The use of nitric acid in conjunction with oxide starting materials provides a material with a bulk density similar to the value of 1.47 g/cm³ measured for SVO prepared from $AgNo_3$.

TABLE 1

| Silver Starting Material | HNO₃ Added | Capacity of SVO To +2.0 V |
|---|---|---|
| AgNO₃ | — | 253 Ah/kg |
| Ag₂O | — | 245 Ah/kg |
| Ag₂O | 1 equiv | 256 Ah/kg |

Another preferred composite cathode material prepared from a mixture of vanadium oxide with nitric acid and a second metal or metal oxide and a third metal or metal oxide, preferably comprising silver and copper, according to the present invention includes $V_2O_z$ wherein z≦5 combined with $Ag_2O_z$ wherein z=2 to 1 and $CuO_z$ wherein z=0 to 1 to provide the mixed metal oxide having the formula $Cu_xAg_yV_2O_z$, (CSVO). Thus, this composite cathode active material may be described as a metal oxide-metal oxide-metal oxide, a metal-metal oxide-metal oxide, or a metal-metal-metal oxide and the range of material composition found for $Cu_xAg_yV_2O_z$ is preferably about 0.01≦x≦1.0, about 0.01≦y≦1.0 and about 5.01≦z≦6.5. Typical forms of CSVO are $Cu_{0.16}Ag_{0.67}V_2O_z$ with Z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium.

Additional cathode active materials that are synthesized from addition reactions using nitric acid according to the present invention include manganese dioxide, cobalt oxide, nickel oxide, copper oxide, titanium disulfide, copper sulfide, iron sulfide, iron disulfide, copper vanadium oxide, and mixtures thereof.

The above described active materials are formed into an electrode for incorporation into an electrochemical cell by mixing one or more of them with a conductive additive such as acetylene black, carbon black and/or graphite. Metallic powders such as nickel, aluminum, titanium and stainless steel in powder form are also useful as conductive diluents when mixed with the above listed active materials. The electrode further comprises a binder material which is preferably a fluoro-resin powder such as powdered polytetrafluoroethylene (PTFE) or powdered polyvinylidene fluoride (PVDF). More specifically, a preferred cathode active material comprises SVO in any one of its many phases, or mixtures thereof, and/or CSVO mixed with a binder material and a conductive diluent.

A preferred cathode active admixture according to the present invention comprises from about 80% to 99%, by weight, of a cathode active material comprising either one or both of the SVO and CSVO materials mixed with a suitable binder and a conductor diluent. The resulting blended cathode active mixture may be formed into a free-standing sheet prior to being contacted with a current collector to form the cathode electrode. The manner in which the cathode active mixture is prepared into a free-standing sheet is thoroughly described in U.S. Pat. No. 5,435,874 to Takeuchi et al., which is assigned to the assignee of the present invention and incorporated herein by reference. Further, cathode components for incorporation into the cell may also be prepared by rolling, spreading or pressing the cathode active mixture of the present invention onto a suitable current collector. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the electrochemical cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, nonwoven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C.H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active material. Preferably the ion-forming alkali metal salt is similar to the alkali metal comprising the anode.

In a solid cathode/electrolyte system, the ionically conductive salt preferably has the general formula $MM'F_6$ or $MM'F_4$ wherein M is an alkali metal similar to the alkali metal comprising the anode and M' is an element selected from the group consisting of phosphorous, arsenic, antimony and boron. Examples of salts yielding $M'F_6$ are: hexafluorophosphate ($PF_6$), hexafluoroarsenate ($AsF_6$) and hexafluoroantimonate ($SbF_6$), while tetrafluoroborate ($BF_4$) is exemplary of salts yielding $M'F_4$. Alternatively, the corresponding sodium or potassium salts may be used. Other inorganic salts useful with the present invention include $LiClO_4$, $LiAlCl_4$, $LiGaCl_4$, $LiC(SO_2CF_3)_3$, $LiN(SO_2CF_3)_2$, $LiSO_3F$, $LiB(C_6H_5)_4$ and $LiCF_3SO_3$, and mixtures thereof.

Low viscosity solvents include tetrahydrofuran (THF), methyl acetate (MA), diglyme, triglyme, tetragylme, dimethyl carbonate (DMC), 1,2-dimethoxyethane (DE), diethyl carbonate and mixtures thereof, and high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-butyrolactone (GBL) and N-methyl-pyrrolidinone (NMP) and mixtures thereof. In the present invention, the preferred anode is lithium metal and the preferred electrolyte is 1.0M to 1.2M $LiAsF_6$ or $LiPF_6$ in PC/DME.

The preferred form of the electrochemical cell is a case-negative design wherein the anode/cathode couple is inserted into a conductive metal casing such that the casing is connected to the anode current collector in a case-negative configuration, as is well known to those skilled in the art. A preferred material for the casing is titanium although stainless steel, mild steel, nickel-plated mild steel and aluminum are also suitable. The casing header comprises a metallic lid having a sufficient number of openings to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

The following examples describe the manner and process of manufacturing an electrochemical cell according to the present invention, and they set forth the best mode contemplated by the inventors of carrying out the invention, but they are not to be construed as limiting.

EXAMPLE I

Preparation of SVO from silver metal and nitric acid

Silver vanadium oxide, $AgV_2O_{5.5}$ (SVO) was synthesized via a solid state reaction of silver metal and vanadium oxide in the presence of nitric acid. In a typical example, silver metal powder, Ag(0) (11.87 g, 0.11 mol) was added to 50 mL of an aqueous solution containing distilled/deionized water and nitric acid, $HNO_3$ (6.8 mL, 0.11 mol) and the resulting admixture was mixed with solid vanadium oxide, $V_2O_5$ (20.00 g, 0.11 mol). The resulting slurry was heated to 110° C. to evaporate all of the water. During this time the slurry was mixed intermittently until the sample became a dry powder. This powder was then ground to thoroughly mix the components. The solid was heated at 230° C. under an air atmosphere for at least 30 minutes, and the temperature increased to 260° C. for at least 2 hours. The temperature was then increased to 300° C. for at least 16 hours, and the material ground again. The sample was finally heated to 375° C. for not less than 24 hours. Upon cooling, the material was used without further preparation. The final product displayed endothermic transitions at 459° C., 533° C. and 544° C. in the differential scanning calorimetry (DSC) curve.

COMPARATIVE EXAMPLE I

Preparation of SVO from silver nitrate

Silver vanadium oxide, $AgV_2O_{5.5}$ (SVO) was synthesized via a solid state reaction of silver nitrate and vanadium oxide. Silver nitrate, $AgNO_3$ (18.68 g, 0.11 mol) was dissolved in 50 mL of deionized/distilled water and the resulting aqueous salt solution was mixed with solid vanadium oxide, $V_2O_5$ (20.00 g, 0.11 mol). The resulting slurry was treated as described in Example I. The final product displayed endothermic transitions at 456° C., 532° C. and 543° C. in the differential scanning calorimetry curve.

COMPARATIVE EXAMPLE II

Preparation of SVO from silver metal

Silver vanadium oxide, $AgV_2O_{5.5}$ (SVO) was synthesized via a solid state reaction of silver metal and vanadium oxide. Silver metal powder, Ag(0) (11.87 g, 0.11 mol) was added to 50 mL of deionized/distilled water and the resulting admixture was mixed with solid vanadium oxide, $V_2O_5$ (20.00 g, 0.11 mol). The resulting slurry was treated as described in Example I. The final product displayed endothermic transitions at 456° C., 532° C. and 543° C. in the differential scanning calorimetry curve.

EXAMPLE II

Preparation of β/γ-phase SVO from silver carbonate and nitric acid

β/γ-phase silver vanadium oxide, $Ag_{1-x}V_2O_y$ (β/γ-SVO) was synthesized via a solid state reaction of silver carbonate and vanadium oxide in the presence of nitric acid. In this example, x=0.33 and y=5.33. Silver carbonate, $Ag_2CO_3$ (5.685 g, 0.021 mol) was added to 20 mL of an aqueous solution containing distilled/deionized water and nitric acid, $HNO_3$ (2.6 mL, 0.041 mol) and the aqueous salt solution was added to solid vanadium oxide, $V_2O_5$ (11.19 g, 0.062 mol). The resulting slurry was heated to 110° C. to evaporate all of the water. During this time the slurry was mixed intermittently until the sample became a dry powder. This powder was then ground to thoroughly mix the components. The solid was heated at 230° C. under an air atmosphere for at least 30 minutes, and the temperature increased to 260° C. for at least 2 hours. The temperature was then increased to 300° C. for at least 16 hours, and the material ground again. The sample was finally heated to 375° C. for not less than 24 hours. Upon cooling the material was used without further preparation. The final product displayed endothermic transitions at 535° C. 549° C. and 555° C. in the differential scanning calorimetry curve.

COMPARATIVE EXAMPLE III

Preparation of β/γ-phase SVO from silver nitrate

β/γ-phase silver vanadium oxide, $Ag_{1-x}V_2O_y$ (β/γ-SVO) was synthesized via a solid state reaction of silver nitrate and vanadium oxide. In this example, x=0.33 and y=5.33. Silver nitrate, $AgNO_3$ (7.005 g, 0.041 mol) was dissolved in 20 mL of deignized/distilled water. The aqueous salt solution was added to solid vanadium oxide, $V_2O_5$ (11.19 g, 0.062 mol). The resulting slurry was treated as described in Example II. The final product displayed endothermic transitions at 534° C., 549° C. and 555° C. in the differential scanning calorimetry curve.

COMPARATIVE EXAMPLE IV

Preparation of β/γ-phase SVO from silver carbonate

β/γ-phase silver vanadium oxide, $Ag_{1-x}V_2O_y$ (β/γ-SVO) was synthesized via a solid state reaction of silver carbonate and vanadium oxide. In this example, x=0.33 and y=5.33. Silver carbonate, $Ag_2CO_3$ (5.685 g, 0.021 mol) was added to 20 mL of deionized/distilled water. The mixture was then added to solid vanadium oxide, $V_2O_5$ (11.19 g, 0.062 mol). The resulting slurry was treated as described in Example II. The final product displayed endothermic transitions at 465° C., 542° C., 549° C. and 552° C. in the differential scanning calorimetry curve.

EXAMPLE III

Preparation of CSVO from silver oxide, copper oxide and nitric acid

Copper silver vanadium oxide, $Cu_xAg_yV_2O_z$ (CSVO) was synthesized via a solid state reaction of silver oxide with copper oxide and vanadium oxide in the presence of nitric acid. Silver oxide, $Ag_2O$ (6.373 g, 0.0275 mol) and copper (II) oxide, CuO (4.375 g, 0.055 mol) were added to 50 mL of an aqueous solution containing distilled/deionized water and nitric acid, $HNO_3$ (20.6 mL, 0.11 mol). The mixture was added to solid vanadium oxide, $V_2O_5$ (20.00 g, 0.33 mol). The resulting slurry was heated to 110° C. to evaporate all of the water. During this time the slurry was mixed intermittently until the sample became a dry powder. This powder was then ground to thoroughly mix the components. The solid was heated at 230° C. under an air atmosphere for at least 30 minutes, and the temperature increased to 260° C. for at least 2 hours. The temperature was then increased to 300° C. for at least 16 hours, and the material ground again. The sample was finally heated to 375° C. for not less than 24 hours. Upon cooling, the material was used without further preparation. The final product had x=0.5, y=0.5, and z=5.75 in the general formula $Cu_xAg_yV_2O_z$ and displayed a single endothermic transition at 524° C. in the differential scanning calorimetry curve.

COMPARATIVE EXAMPLE V

Preparation of CSVO from silver nitrate and copper nitrate

Copper silver vanadium oxide, $Cu_xAg_yV_2O_z$ (CSVO) was synthesized via a solid state reaction of silver nitrate, copper nitrate and vanadium oxide. In this example, x=0.5, y=0.5, and z=5.75. Silver nitrate, $AgNO_3$ (9.34 g, 0.055 mol) was added to copper(II) nitrate, $Cu(NO_3)_2 \cdot 2.5H_2O$ (12.79 g, 0.055 mol) and the admixture was dissolved in 47.5 mL of deionized/distilled water. The resulting aqueous salt solution was added to solid vanadium oxide, $V_2O_5$ (20.00 g, 0.11 mol). The resulting slurry was then treated as described in Example III. The final product displayed a single endothermic transition at 524° C. in the differential scanning calorimetry curve.

COMPARATIVE EXAMPLE VI

Preparation of CSVO from silver oxide and copper oxide

Copper silver vanadium oxide, $Cu_xAg_yV_2O_z$ (CSVO) was synthesized via a solid state reaction of silver oxide, copper oxide and vanadium oxide. In this example, x=0.5, y=0.5, and z=5.75. Silver oxide, $Ag_2O$ (6.373 g, 0.0275 mol) and copper(II) oxide, CuO (4.375 g, 0.055 mol) were added to 50 mL of deionized/distilled water. The resulting mixture was added to solid vanadium oxide, $V_2O_5$ (20.00 g, 0.11 mol). The resulting slurry was then treated as described in Example III. The final product displayed endothermic transitions at 455° C., 461° C., 489° C., 504° C. and 525° C. in the differential scanning calorimetry curve.

EXAMPLE IV

Preparation of CSVO from silver oxide, copper oxide and 0.5 equiv nitric acid

Copper silver vanadium oxide, $Cu_xAg_yV_2O_z$ (CSVO) was synthesized via a solid state reaction of silver oxide with copper oxide and vanadium oxide in the presence of 0.5 equivalents of nitric acid. In this example, x=0.5, y=0.5, and z=5.75. Silver oxide, $Ag_2O$ (6.373 g, 0.0275 mol) and copper(II) oxide, CuO (4.375 g, 0.055 mol) were added to 50 mL of an aqueous solution containing distilled/deionized water and nitric acid, $HNO_3$ (3.4 mL, 0.055 mol). The resulting mixture was added to solid vanadium oxide, $V_2O_5$ (20.00 g, 0.11 mol). The resulting slurry was then treated as described in Example III. The final product displayed a single endothermic transition at 535° C. in the differential scanning calorimetry curve.

EXAMPLE V

Preparation of CSVO from silver oxide, copper oxide and 0.25 equiv nitric acid Copper silver vanadium oxide, $Cu_xAg_yV_2O_z$ (CSVO) was synthesized via a solid state reaction of silver oxide with copper oxide and vanadium oxide in the presence of 0.25 equivalents of nitric acid. In this example, x=0.5, y=0.5, and z=5.75. Silver oxide, $Ag_2O$ (6.373 g, 0.0275 mol) and copper(II) oxide, CuO (4.375 g, 0.055 mol) were added to 50 mL of an aqueous solution containing distilled/deionized water and nitric acid, $HNO_3$ (1.7 mL, 0.027 mol). The resulting mixture was added to solid vanadium oxide, $V_2O_5$ (20.00 g, 0.11 mol). The resulting slurry was then treated as described in Example III. The final product displayed a single endothermic transition at 535° C. in the differential scanning calorimetry curve.

ELECTROCHEMICAL DISCHARGE OF CATHODE MATERIALS

The ability of the cathode materials prepared in Examples I to V and Comparative Examples I to VI to intercalate alkali metal ions was tested in lithium cells activated with a nonaqueous electrolyte. Each of the experimental cells utilized a cathode in the form of a pellet (1.4×3.6×0.06 to 0.08 cm) consisting of a mixture of 94% of the respectively prepared cathode active materials (by weight) along with 3% polytetrafluoroethylene, 2% graphite and 1% carbon black, pressed at 31 ton pressure onto an expanded metal current collector. The cathodes were each separated from a lithium anode by a polypropylene separator. Lithium metal (1.4× 3.6×0.08 cm), also in contact with an expanded metal current collector, was placed against the separator facing the cathode. Both electrodes were surrounded by glass plates and held together by small metal clamps. The thusly constructed cells were placed in glass enclosures and filled with 1M LiAsF$_6$ PC/DE electrolyte.

Each of the test cells was discharged at a constant resistance (200Ω) down to a voltage of +1.5 V vs ni/Li$^+$. The voltage profile of the cells were monitored as a function of time. The discharge curves for the cathode materials described above are displayed in FIGS. 1 to 4. In FIG. 1, curve 10 was constructed from the voltage versus discharge capacity of the cell built according to Example I, curve 12 was constructed from the discharge of the cell built according to Comparative Example I and curve 14 was constructed from the discharge of the cell built according to Comparative Example II. The present invention cell having the cathode comprising SVO synthesized from silver metal and nitric acid starting materials exhibited a discharge capacity comparable to the prior art cell having SVO prepared in a decomposition reaction of silver nitrate and vanadium oxide. Further, the cell of the present invention had increased discharge capacity with respect to the cell having SVO prepared from silver metal and vanadium oxide starting materials.

Figure 2:
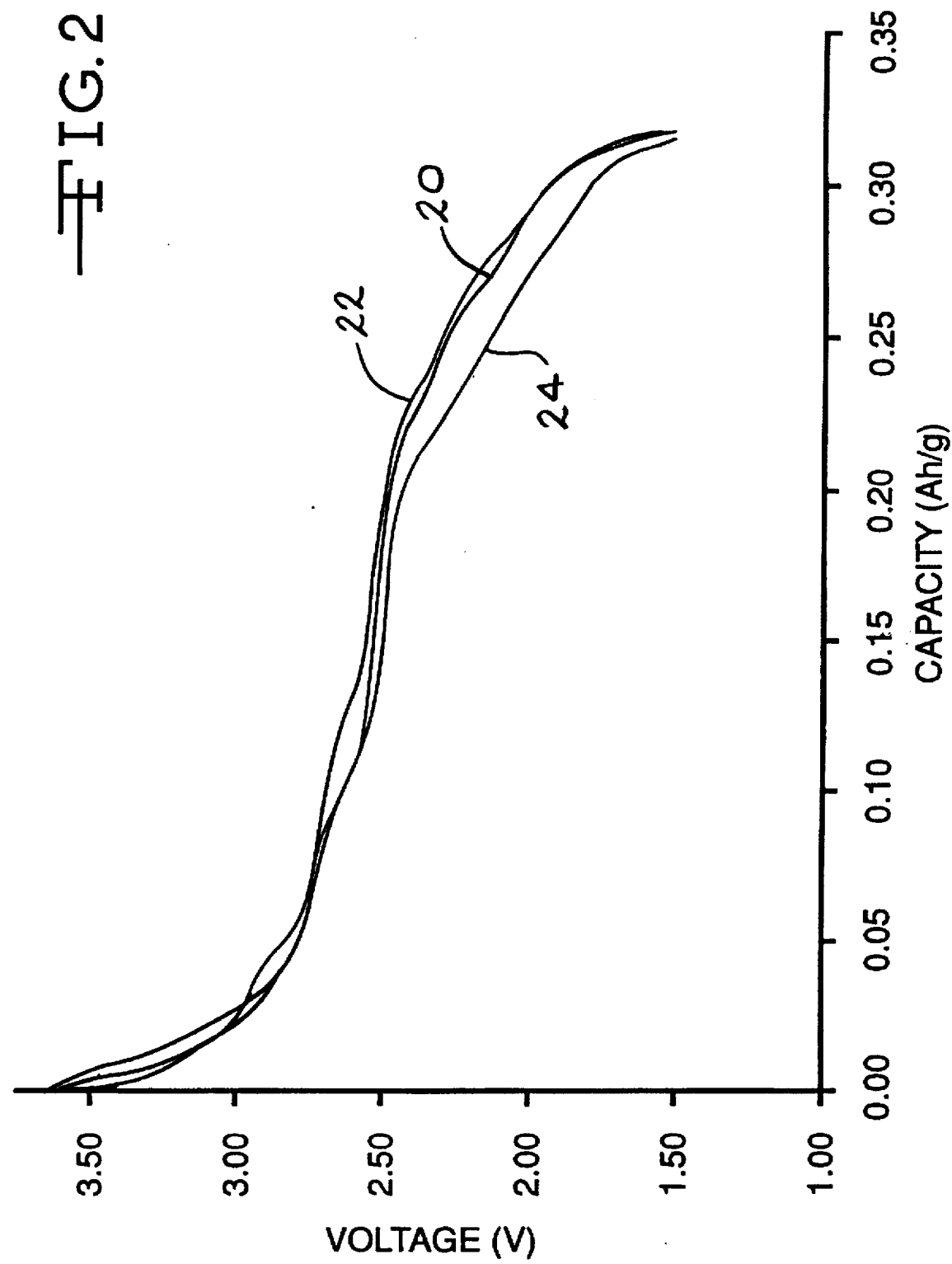

In FIG. 2, curve 20 was constructed from the voltage versus discharge capacity of the present invention cell built according to Example II, curve 22 was constructed from the discharge of the cell built according to Comparative Example III and curve 24 was constructed from the discharge of the cell built according to Comparative Example IV. The present invention cell having the β/γ-phase SVO synthesized from silver carbonate and nitric acid starting materials exhibited comparable discharge capacity with respect to the prior art cell having β/γ-phase SVO prepared in a decomposition reaction using silver nitrate, and an increased capacity with respect to the prior art cell having β/γ-phase SVO prepared via a solid state reaction of silver carbonate and vanadium oxide.

Figure 3:
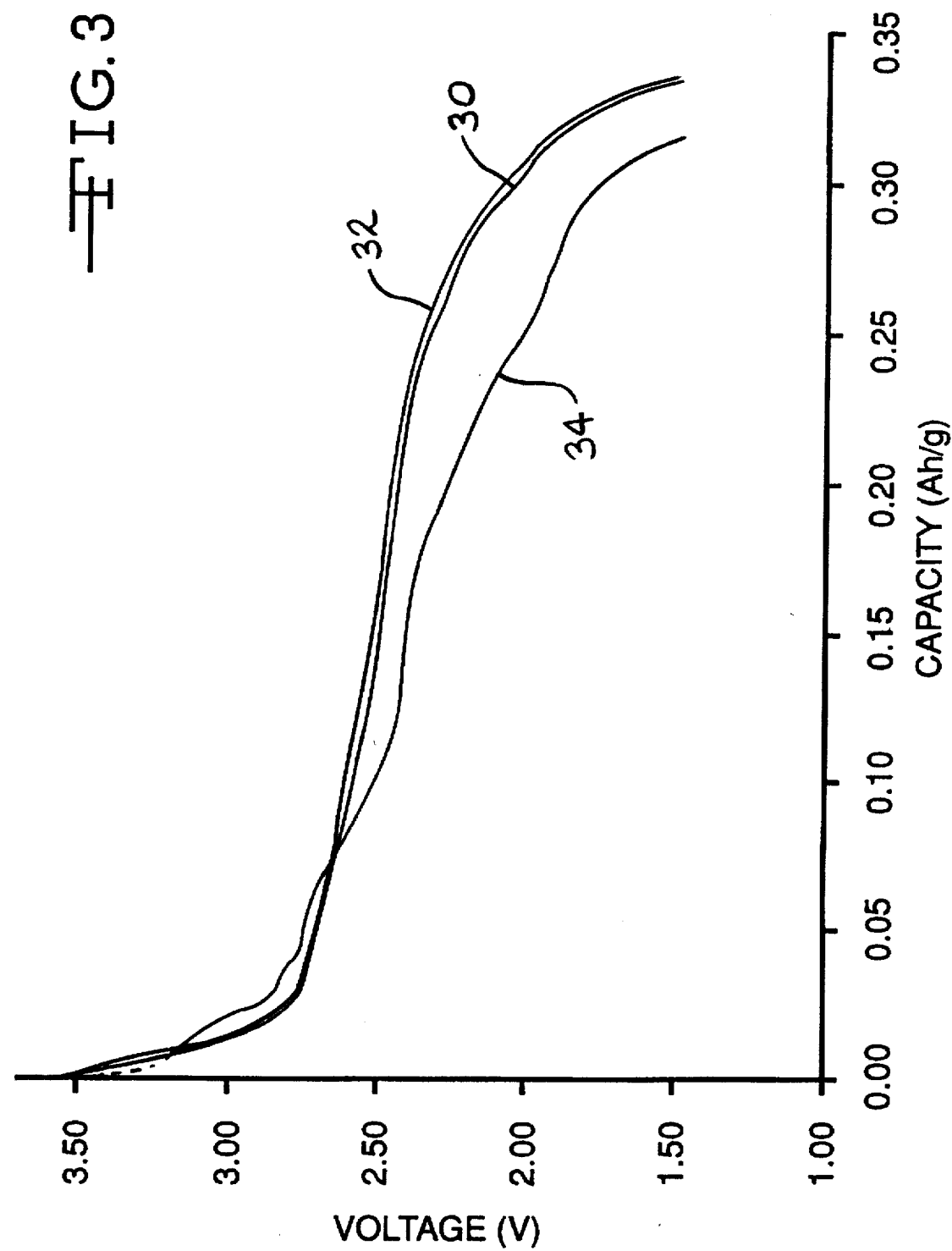

In FIG. 3, curve 30 was constructed from the voltage versus discharge capacity of the present invention cell built according to Example III, curve 32 was constructed from the discharge of the cell built according to Comparative Example V and curve 34 was built from the discharge of the cell built according to Comparative Example VI. The present invention cell having the cathode comprising CSVO prepared from silver oxide, copper oxide and nitric acid starting materials exhibited comparable discharge capacity with respect to the prior art cell having CSVO cathode active material prepared in a decomposition reaction of silver nitrate and copper nitrate starting materials, and an increased capacity with respect to the prior art cell having CSVO cathode material prepared via a solid state reaction of silver oxide, copper oxide and vanadium oxide.

In FIG. 4, curve 40 was constructed from the voltage versus discharge capacity of the present invention cell built according to Example IV, curve 42 was constructed from the discharge of the present invention cell built according to Example V and curve 34 was again constructed from the discharge of the prior art cell built according to Comparative Example VI. The present invention cells having the cathode comprising CSVO prepared from silver oxide, copper oxide and either a 0.5 or a 0.25 equivalent of nitric acid also exhibited increased capacity with respect to the prior art cell having CSVO cathode material synthesized via a decomposition reaction of silver nitrate and copper nitrate starting materials.

Thus, the present invention accomplishes its objectives by providing a technique for the synthesis of mixed metal oxides, for example, silver vanadium oxide and copper silver vanadium oxide, that minimizes the liberation of toxic NO$_x$ gas while meeting, and in some cases, exceeding the discharge performance of similar materials prepared according to the prior art. In particular, the preceding examples show that the preparation of SVO from oxide starting materials combined with nitric acid minimizes the liberation of toxic NO$_x$ gas and provides active materials with discharge capacities comparable to SVO made with nitrate and nitrite starting materials, and having increased discharge capacity with respect to SVO made from metals and metal carbonates. Additionally, the preparation of CSVO from oxide starting materials combined with nitric acid limits the liberation of toxic NO$_x$ gas and provides an active material with a discharge capacity comparable to CSVO made with nitrate and nitrite starting materials, and having increased delivered capacity with respect to the same active material prepared from oxide starting materials. For CSVO made from nitric acid combined with oxide starting materials, the stated improvements are realized even when substoichiometric amounts of nitric acid are used.

The capacity values from these discharge experiments are listed in Table 2.

TABLE 2

Experimental Discharge Capacity from Lithium Test Cells

| Example | Cathode Material | Starting Materials (except V$_2$O$_5$) | Equiv Nitric Acid | Discharge Capacity (mAh/g) To +2.0 V Cutoff | To +1.5 V Cutoff |
|---|---|---|---|---|---|
| Example I | SVO | Ag(0) + HNO$_3$ | 1 | 277 | 303 |
| Comparative Example I | SVO | AgNO$_3$ | — | 278 | 307 |
| Comparative Example II | SVO | Ag(0) | — | 264 | 285 |
| Example II | β/γ-SVO | Ag$_2$CO$_3$ + NHO$_3$ | 1 | 291 | 319 |
| Comparative Example III | β/γ-SVO | AgNO$_3$ | — | 293 | 318 |
| Comparative Example IV | β/γ-SVO | Ag$_2$CO$_3$ | — | 272 | 319 |
| Example III | CSVO | Ag$_2$O + CuO + HNO$_3$ | 3 | 309 | 333 |
| Comparative Example V | CSVO | AgNO$_3$ + Cu(NO$_3$)$_2$ | — | 310 | 335 |
| Comparative Example VI | CSVO | Ag$_2$O + CuO | — | 258 | 315 |
| Example IV | CSVO | Ag$_2$O + CuO + HNO$_3$ | 0.5 | 302 | 331 |
| Example V | CSVO | Ag$_2$O + CuO + HNO$_3$ | 0.25 | 305 | 336 | according to Example III, curve 32 was constructed from the discharge of the cell built according to Comparative It is appreciated that various modifications to the inventive concepts described herein may be apparent to those

What is claimed is:

1. A method of providing an electrochemical cell, which comprises:
   a) providing a casing;
   b) housing the electrochemical cell within the casing, comprising the steps of:
      i) providing an anode;
      ii) providing a cathode, comprising the steps of: combining vanadium oxide with a mixture of nitric acid and at least one of a silver-containing constituent and a copper-containing constituent to provide a mixed metal oxide admixture, wherein the silver- and the copper-containing constituents do not contain nitrogen; reacting the mixed metal oxide admixture to provide a mixed metal oxide; and contacting the mixed metal oxide to a current collector; and
      iii) positioning the anode and the cathode inside the casing; and
   c) activating the anode and the cathode with an electrolyte solution filled in the casing.

2. The method of claim 1 including reacting the mixed metal oxide admixture to provide the mixed metal oxide having the general formula $Cu_xAg_yV_2O_z$ wherein $0.01 \leq x \leq 1.0$, $0.1 \leq y \leq 1.0$ and $5.01 \leq z \leq 6.5$.

3. The method of claim 1 including reacting the mixed metal oxide admixture to provide the mixed metal oxide having a stoichiometric formulation consisting of either $Cu_{0.16}Ag_{0.67}V_2O_z$ with z being about 5.5 or $Cu_{0.5}Ag_{0.5}V_2O_z$ with z being about 5.75, and mixtures thereof.

4. The method of claim 1 including reacting the mixed metal oxide admixture to provide the mixed metal oxide having the general formula $Ag_xV_zO_y$ and wherein $0.30 \leq x \leq 2.0$ and $4.5 \leq y \leq 6.0$.

5. The method of claim 1 including providing the anode is comprised of a Group IA metal.

6. The method of claim 1 including providing the electrolyte solution operatively associated with the anode and the cathode comprising an ion-forming alkali metal salt dissolved in a nonaqueous solvent, and wherein the alkali metal of the salt is similar to an alkali metal comprising the anode.

7. A method of making a cathode for an electrochemical cell, the cathode comprising a mixed metal oxide, which method comprises:
   a) combining vanadium oxide with a mixture of nitric acid and at least one of a silver-containing constituent and a copper-containing constituent to provide a mixed metal oxide admixture, wherein the silver- and the copper-containing constituents do not contain nitrogen;
   b) reacting the mixed metal oxide admixture to provide the mixed metal oxide; and
   c) forming the mixed metal oxide into the cathode.

8. The method of claim 7 including reacting the mixed metal oxide admixture to provide the mixed metal oxide having the general formula $Cu_xAg_yV_2O_z$ wherein $0.01 \leq x \leq 1.0$, $0.1 \leq y \leq 1.0$ and $5.01 \leq z \leq 6.5$.

9. The method of claim 7 including reacting the mixed metal oxide admixture to provide the mixed metal oxide having a stoichiometric formulation consisting of either $Cu_{0.16}Ag_{0.67}V_2O_z$ with z being about 5.5 or $Cu_{0.5}Ag_{0.5}V_2O_z$ with z being about 5.75, and mixtures thereof.

10. The method of claim 7 including reacting the mixed metal oxide admixture to provide the mixed metal oxide having the general formula $Ag_xV_zO_y$ and wherein $0.30 \leq x \leq 2.0$ and $4.5 \leq y \leq 6.0$.

11. A method of making a cathode for an electrochemical cell, the cathode comprising a mixed metal oxide, which method comprises:
   a) combining vanadium oxide with nitric acid and at least one of the group consisting of a silver oxide, a copper oxide and a manganese oxide to provide a mixed metal oxide admixture;
   b) reacting the mixed metal oxide admixture to provide the mixed metal oxide; and
   c) forming the mixed metal oxide into the cathode.

12. The method of claim 11 including reacting the mixed metal oxide admixture to provide the mixed metal oxide having the general formula $Cu_xAg_yV_2O_z$ wherein $0.01 \leq x \leq 1.0$, $0.1 \leq y \leq 1.0$ and $5.01 \leq z \leq 6.5$.

13. The method of claim 11 including reacting the mixed metal oxide admixture to provide the mixed metal oxide having the general formula $Ag_xV_zO_y$ and wherein $0.30 \leq x \leq 2.0$ and $4.5 \leq y \leq 6.0$.

* * * * *